US012661691B2

(12) United States Patent
Czapp et al.

(10) Patent No.: US 12,661,691 B2
(45) Date of Patent: Jun. 23, 2026

(54) FLOUR SIFTING DEVICE

(71) Applicant: Franke Technology and Trademark Ltd., Hergiswil (CH)

(72) Inventors: Ireneusz Czapp, Reda (PL); Aleksander Majorek, Gniewowo (PL); Andrzej Tusk, Rotmanka (PL); Grzegorz Glodowski, Gdynia (PL); Rafal Ciesielczyk, Wejherowo (PL); Mark Zheng, Heshan City (CN); Bruce Li, Heshan City (CN)

(73) Assignee: Franke Technology and Trademark Ltd., Hergiswil (CH)

( * ) Notice: Subject to any disclaimer, the term of this patent is extended or adjusted under 35 U.S.C. 154(b) by 0 days.

(21) Appl. No.: 19/079,740

(22) Filed: Mar. 14, 2025

(65) Prior Publication Data

US 2025/0326005 A1 Oct. 23, 2025

(30) Foreign Application Priority Data

Apr. 17, 2024 (EP) .................................... 24170868

(51) Int. Cl.
*B07B 1/20* (2006.01)
*B07B 1/46* (2006.01)

(52) U.S. Cl.
CPC . *B07B 1/20* (2013.01); *B07B 1/46* (2013.01)

(58) Field of Classification Search
CPC .............. B07B 1/20; B07B 1/46; B07B 1/524
See application file for complete search history.

(56) References Cited

U.S. PATENT DOCUMENTS 5,051,169 A * 9/1991 King .......................... B07B 1/46 209/390
2014/0366750 A1* 12/2014 Harned ................... A23P 20/12 99/494

FOREIGN PATENT DOCUMENTS

| | | | |
|---|---|---|---|
| DE | 36406 | C | 7/1886 |
| DE | 10149515 | A1 | 4/2003 |
| EP | 2666549 | B1 | 5/2016 |
| GB | 190910217 | A | 4/1910 |
| WO | 2007059919 | A2 | 5/2007 |
| WO | 2023117787 | A1 | 6/2023 |

* cited by examiner

*Primary Examiner* — Michael Mccullough
*Assistant Examiner* — Kalyanavenkateshware Kumar
(74) *Attorney, Agent, or Firm* — Volpe Koenig

(57) ABSTRACT

A flour sifting device (1), having a flour sifting tank provided with a flour sifting trough with flour sifting holes at the bottom, and a rotating brush located inside the flour sifting tank having a rotating shaft (7*) and devised to brush the flour sifting holes. The rotating brush hasa first plurality of discrete flexible brush elements (12*c) that are distributed on said rotating shaft (7*) and extend therefrom in a radial direction with respect to said rotating shaft (7*) such that collectively they form a screw conveyor with a circular outer contour. The brush elements (12*c) are arranged on a second plurality of separate identical brush modules (12*), each brush module (12*) including a number of said brush elements (12*c), preferably an equal number of said brush elements (12*c), and the brush modules (12*) are individually and removably mounted or mountable on the rotating shaft (7*).

17 Claims, 12 Drawing Sheets

FLOUR SIFTING DEVICE

CROSS-REFERENCE TO RELATED APPLICATIONS

This application claims priority rom European Patent Application No. 24170868.4, filed Apr. 17, 2024, which is incorporated herein by reference as if fully set forth.

TECHNICAL FIELD

The present invention relates to a flour sifting device, and in particular to a flour sifting device for sifting flour in coarse flour and fine flour.

BACKGROUND

The diameter of the flour sifting holes in known flour sifting machines available on the current market is usually very small. The flour sifting holes can thus separate particles with large diameters and sift fine flour. However, the smaller the diameter of the flour sifting holes, the more easily the flour sifting holes can become clogged. The sifting efficiency of any flour sifting machine heavily therefore depends on whether or not the flour sifting holes are clogged. If the flour sifting holes are clogged, it is difficult to improve or even uphold the sifting effect.

In order to improve sifting efficiency, WO 2023/117787 A1 proposes to use rotating flexible brushes that are arranged on a rotary brush shaft, the flexible brushes being distributed helically and evenly along the rotary brush shaft. The flexible brushes rotate to brush the flour sifting holes at the bottom of the flour sifting tank. The rotary brush shaft rotates to drive the flexible brushes to rotate in a direction. In this way, the helical arrangement of the flexible brushes acts as a screw conveyor and transports coarse flour or lumps of flour sideways away from the flour sifting holes for to prevent clogging thereof.

However, applicant has found that in some cases the sideways transport of flour may be over-efficient, thus sifting out too much of the fine flour before it can leave the machine through said sifting holes. Furthermore, lumps of flour may get stuck between said flexible brushes, which can prevent and hinder proper operation of the device.

SUMMARY

The object of the present invention is to at least provide an improved sifting device, which continues to reduce the problem of clogging of flour sifting holes while improving the sifting efficiency and in particular providing improved accuracy and efficiency of fine and coarse flour separation.

Flour in the context of the present invention is to be broadly understood to refer in particular to all kind of food coating material, including breadcrumbs, cereal flour, cheese flakes, spices and so on, also including mixtures of the above components.

The object is achieved by means of a flour sifting device having one or more of the features defined herein. Preferred further developments thereof are described below and in the claims.

According to the invention, a flour sifting device comprises: a flour sifting tank being provided with a flour sifting trough with flour sifting holes at the bottom and a rotating brush located inside the flour sifting tank having a rotating shaft and devised to brush the flour sifting holes. The rotating brush comprises a first plurality of discrete flexible brush elements that are distributed on said rotating shaft and extend therefrom in a radial direction with respect to said rotating shaft in such a way that collectively they form a screw conveyor with a circular outer contour which serves to transport dough or flour lumps away from the flour sifting holes. The flour sifting device is further characterized in that said brush elements are arranged on a second plurality of separate identical brush modules, each brush module comprising a number of said brush elements. Preferably, each one of said brush module comprises an equal number of said brush elements. Furthermore, the brush modules are individually and removably mounted or mountable on the rotating shaft.

In one embodiment, said first plurality (i.e., a number of the brush elements) will be greater than said second plurality (i.e., a number of the brush modules), if there is more than one brush element per module. However, an advantageous embodiment of the flour sifting device has brush modules with just one brush element, so that said first plurality equals said second plurality in terms of numbers.

The feature of said brush modules being individually and removably mounted or mountable on the rotating shaft enables easy cleaning thereof, in particular if flour lumps get stuck between the brush elements and are trapped there. An additional advantage resides in the fact that brush modules that become damaged can be easily replaced without having to change the entire brush.

In this way, while continuing to reduce the problem of clogging of the flour sifting holes, the sifting efficiency is improved which leads to an improved accuracy and efficiency of fine and coarse flour separation.

The brush elements are preferable made of silicone, which has proved useful in the context of the present invention.

The present specification explicitly also relates to a flour sifting device having one or more of the features disclosed herein, which flour sifting device is further devised as comprised in any one of the dependent claims. In other words, the rotating brush need not be composed of a plurality of brush modules, but can be integrally formed as in, e.g., WO 2023/117787 A1.

In another embodiment of the flour sifting device according to the invention there is at least one brush element per brush module, said brush element forming essentially a complete helical winding. Such a helical winding has a corresponding pitch, i.e., a beginning of such winding and an end thereof are separated, in an axial direction of the rotating shaft, by a (small) distance. The winding need not be fully complete in a circumferential direction, i.e., it need not cover a full range of 360°, as will be explained further below.

Such a design of the brush modules can help to ensure efficient sideways transport of coarse flour and/or lumps.

In another embodiment of the flour sifting device according to the invention said brush element comprises at least one radial notch and the separate brush modules are arranged on the rotating shaft such that respective notches of the brush modules are aligned in a direction parallel to the rotating shaft.

Preferably, said notches are formed by not fully completing said helical winding with respect to the brush element (angle coverage <360°). If said end of the winding is arranged at a different (circumferential) position than said beginning thereof, said radial notch will naturally result. One may then only have to design the respective edges parallel to each other in order to obtain a rectangular notch—if viewed along a longitudinal axis of the rotating shaft. However, said notch may alternatively be located elsewhere on a given brush module.

In another embodiment of the flour sifting device according to the invention a stirring bar (or baffle) extends parallel to the rotating shaft. Said stirring bar is preferably devised as a separate element with respect to the brush modules and can be held in the notches of the brush modules. It is therefore easily removeable and/or replaceable.

Applicant has found that this type of arrangement can be highly advantageous since the stirring bar, which can have the same dimension, in a radial direction with respect to the rotating shaft, as the brush elements, lifts the material to be sieved or sifted (i.e., the flour) over the helical winding to slow down the sideways or lateral transport, which improves the sieving/sifting effect.

In another embodiment of the flour sifting device according to the invention, the same effect can be achieved if the brush modules themselves further comprise a stirring element that is arranged on at least one side of the brush element and that extends in the radial direction.

This may make the overall design of the sifting device simpler, because an additional stirring bar is no longer required.

Preferably, a stirring element is located on each side of a given brush element in order to enhance the stirring effect that can be obtained.

In another embodiment of the flour sifting device according to the invention the stirring element extends essentially over a whole diameter of the brush module. This will help to further enhance the stirring effect. A possible exception will be the middle or central portion of the brush module, which accommodates the rotating shaft and therefore preferably does not comprise said stirring element.

In other words: the stirring element may present a break or interruption in a central portion of the brush module.

In another embodiment of the flour sifting device according to the invention the stirring element is formed integrally with the brush element.

This may result in an advantageous design with increased stability of the brush elements and the stirring element.

In another embodiment of the flour sifting device according to the invention, in the case of having a stirring element on each side of the brush element, the stirring elements on both sides of the brush element are located at a common circumferential position.

Applicant has found that such an arrangement can help to enhance the desired effect.

In another embodiment of the flour sifting device according to the invention said stirring elements, in combination, cover a pitch of said brush element in an axial direction.

In this way, said pitch is entirely closed by the stirring elements in a circumferential direction, which helps to ensure the desired effect.

There can be more than one stirring element on each side of the brush element.

In another embodiment of the flour sifting device according to the invention there are a plurality of brush elements per brush module, preferably at least three, most preferably at least five. Said brush elements can be arranged equally spaced in a circumferential direction, which can result in a star-like appearance. Furthermore, said brush elements collectively form at least one, preferably more than one, helical winding. However, said winding need not be continuous-there can be one or several breaks or interruptions. Again, said winding has a pitch and serves to achieve lateral transport of the material to be sifted.

In another embodiment of the flour sifting device according to the invention at least one of said brush elements, preferably two of said brush elements, is/are oriented in counter-helical fashion. This can imply that it is (or they are) inclined opposite to the other brush elements.

This particular feature can achieve the same or a similar effect as said stirring bar (baffle) or as said stirring element(s). It slows down lateral transport by providing a counter-effect, thus enhancing the desired sifting effect.

The brush element(s) can have serrations or notches on its (their) edge(s), which has proven to be useful for obtaining a good sifting result.

In another embodiment of the flour sifting device according to the invention the brush modules are aligned on the rotating shaft with respect to a circumferential position of the brush elements. In other word: the brush elements are arranged in a common circumferential configuration of the rotating shaft, so that they completely overlap when viewed in an axial direction. This refers in particular to said counter-helical element and/or, with reference to a corresponding sub-claim/embodiment, to the stirring elements.

In another embodiment of the flour sifting device according to the invention the brush modules comprise a central through-hole for accommodating the rotating shaft. Said through-hole preferably comprises an alignment notch and said rotating shaft preferably comprises a longitudinal protrusion for engaging said alignment notch.

In this way, a desired orientation of the brush modules on said rotating shaft can be easily ensured. In a more general fashion, there can be an unambiguous outer/inner contour mating between the rotation shaft and the brush modules, respectively, so that the latter can only be placed on the former with a predefined orientation.

In another embodiment of the flour sifting device according to the invention said rotating shaft has a square section, preferably with the exception of the above-mentioned protrusion.

This can help to achieve said predefined orientation, and it also helps to transfer torque from the rotating shaft to the brush modules.

In another embodiment of the flour sifting device according to the invention the rotating shaft has one end with a stop for the brush modules and one threaded end for threadedly securing said brush modules on the rotating shaft.

In this way, the brush modules and the rotating shaft can be assembled easily, and the brush modules can be safely secured on the rotating shaft, in particular by screwing a threaded nut, washer or cap or the like on said threaded end.

The invention also relates to an isolated rotating brush for use in a flour sifting device, which rotating brush can have any useful combination of the features that were described above with respect to the brush modules, the brush elements or the rotating shaft. Just a rotating brush can be used to retrofit existing flour sifting devices of the type that is described herein.

BRIEF DESCRIPTION OF THE DRAWINGS

Further features and advantages of the present invention will become apparent from the following description of preferred embodiments with respect to the drawings.

DETAILED DESCRIPTION

In all of the Figures, the same reference signs are used to indicate same elements or at least elements having similar functions.

Figure 1:
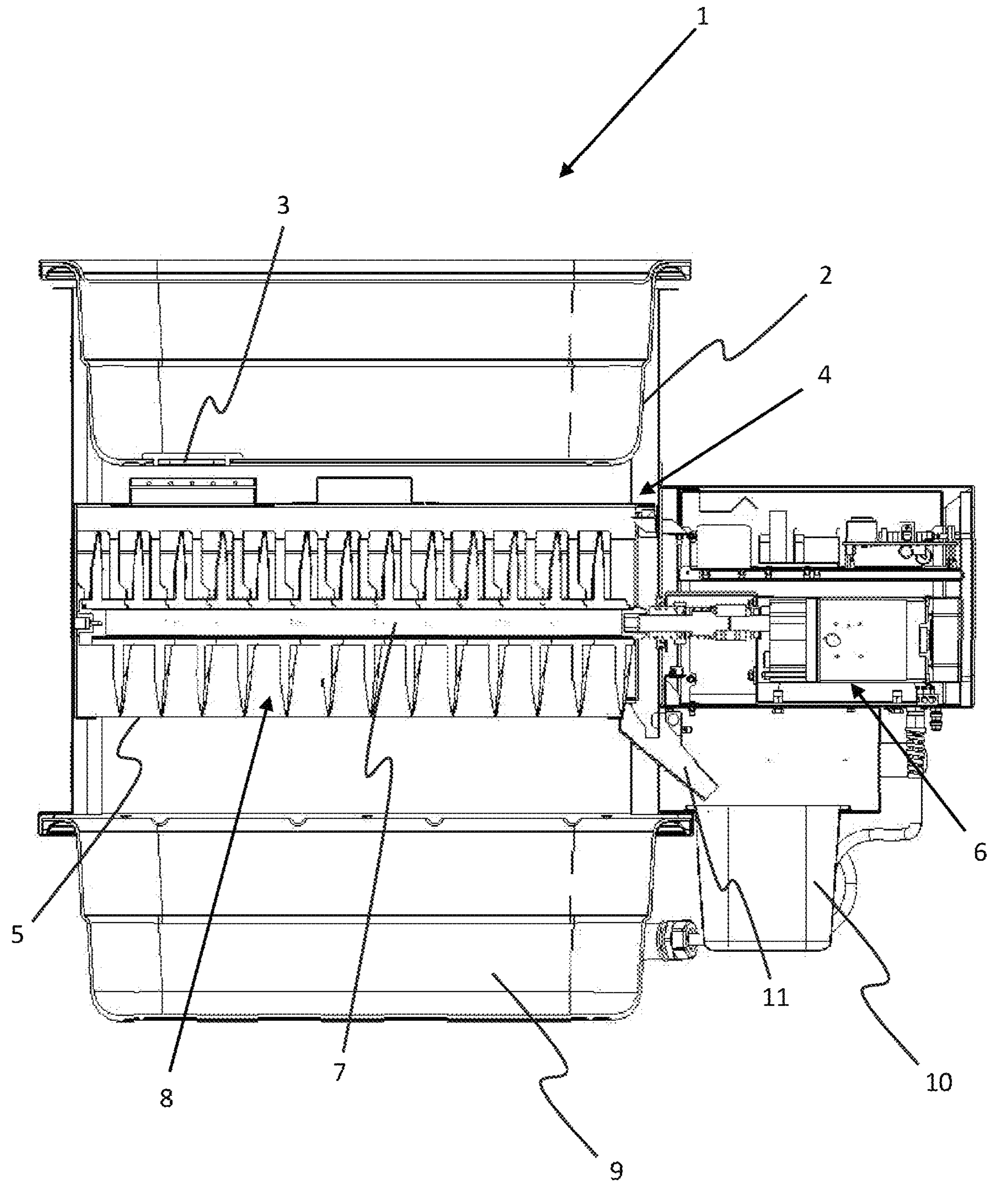
FIG. 1 shows an embodiment of the flour sifting device in a sectional view.

FIG. 1 provides an overview of the flour sifting device in accordance with the invention. Referring to FIG. 1, according to one embodiment, the flour sifting device 1 comprises a flour accommodating basin 2, the flour accommodating basin 2 having a first flour outlet 3 at the bottom. A flour sifting tank 4 is located below the flour accommodating basin 2, and a flour sifting trough 5 is accommodated in the flour accommodating tank 4, which flour sifting trough 5 is provided with flour sifting holes (not visible) at its bottom. The flour sifting device 1 also comprises a transmission (or motor) device 6, said transmission device 6 being used to rotatably drive a rotary brush shaft or rotating shaft 7 that is set in the flour sifting tank 4. The rotary brush shaft or rotating shaft 7 is provided with silicone brushes 8 that are helically distributed in space, as will be described in detail later. The rotary brush shaft 7 is rotated in order to brush the flour sifting holes with said silicone brushes 8. A fine flour basin 9 is located below the flour sifting tank 4 and fine flour in a flour mixture being sifted through the flour sifting holes of the flour sifting tank 4 or trough 5 will fall into the fine flour basin 9. Furthermore, a coarse flour basin 10 is located below the flour sifting tank 4 on one side far away from the first flour outlet 3, and coarse flour or flour lumps, after being sifted by the flour sifting tank 4 or trough 5, will be transported laterally under action of the helical brushes 8 and slide into the coarse flour basin 10 via a flour discharge passage 11 located on one side of the flour sifting tank 4.

This functioning is similar to the functioning of the sifting device described in WO 2023/117787 A1, the entire contents of which is herewith incorporated by reference in the present description.

Figure 2:
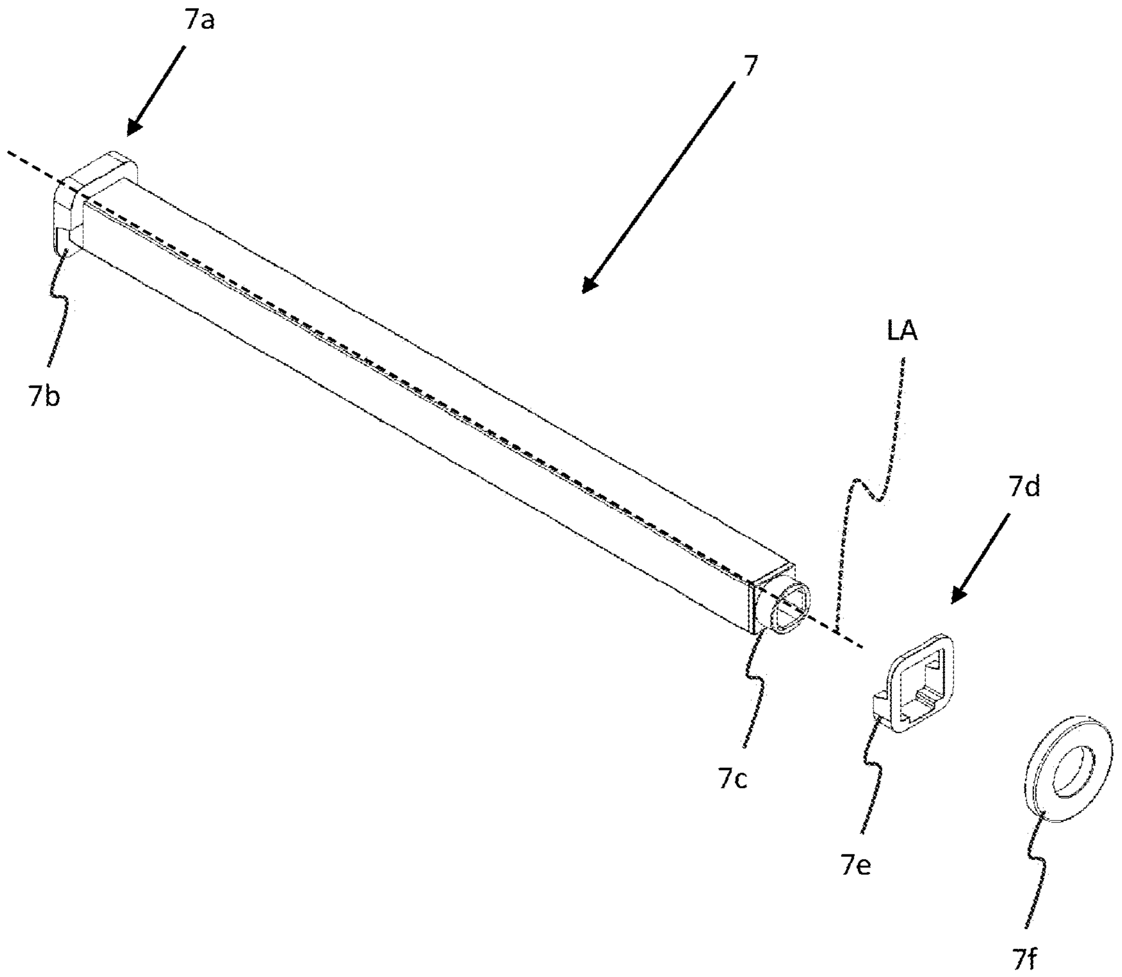
FIG. 2 shows an embodiment of the rotating shaft in disassembled form.

FIG. 2 shows the rotating shaft 7 in isolated and disassembled form. The rotating shaft 7 has a square cross-section. At one end, there is a stop 7*a* that serves as an abutment for one of the brush modules (cf. FIGS. 3 ff). The stop 7*a* has at least one recess 7*b*, a function of which will become apparent later. At the other end, there is a threaded protrusion 7*c* for securing thereon a holding element 7*d* having a protrusion 7*e* that is complementary to recess 7*b* by means of a threaded washer 7*f*. Reference sign LA denotes a longitudinal axis of the rotating shaft 7, which coincides with a rotation axis thereof.

Figure 3:
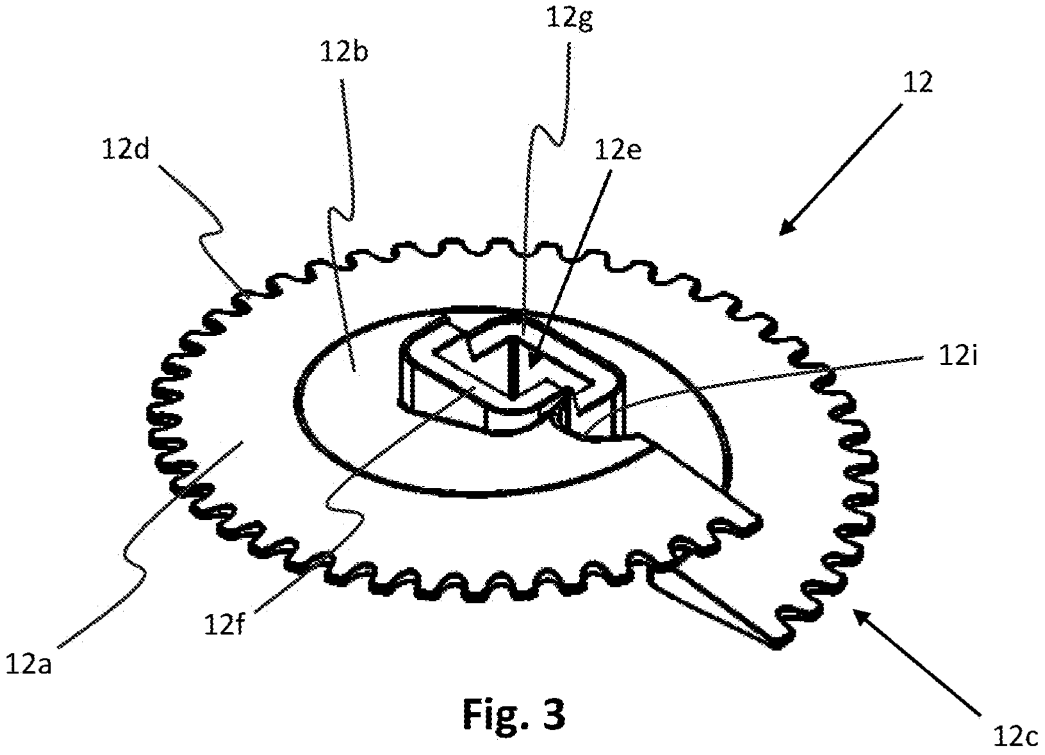
FIG. 3 shows a first embodiment of the brush modules.
Figure 4:
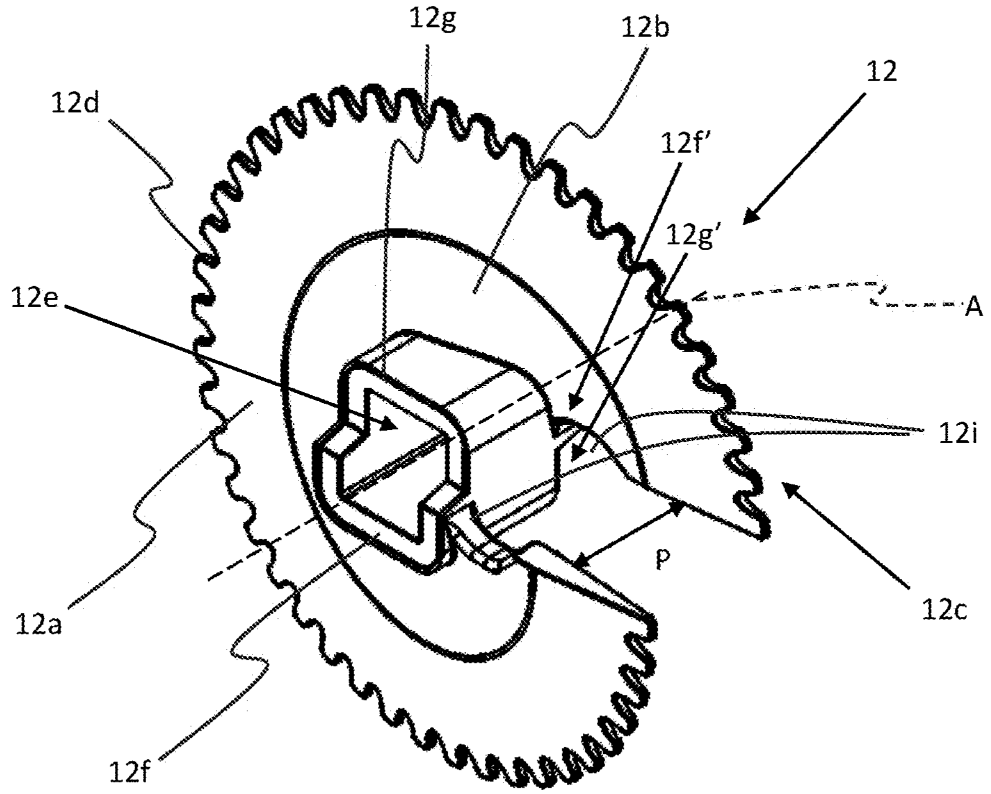
FIG. 4 shows an alternative view of the brush module in FIG. 3.

FIGS. 3 and 4 show different perspective views of a brush module 12, a plurality of which are used in the context of the present invention to constitute the rotating brush or the silicone brushes 8 mentioned earlier. However, while silicone is a preferred material in this context, the invention is not limited to this choice of material. Furthermore, as stated before, the present disclosure shall also encompass a design in which the rotating brush is not made from distinct, separate brush modules 12, but in integral from, as shown, e.g., in WO 2023/117787 A1.

Brush module 12 can be entirely made from silicone or it can be made therefrom in its outer portion 12*a*, whereas an inner portion 12*b* is made from a different material, e.g., a plastics material or metal or a combination of different materials, including coating. The outer portion 12*a* forms a brush element 12*c* that has indentations 12*d* along its outer periphery. The brush element 12*c* is formed helically with respect to a central axis A of the brush module 12 that coincides with said longitudinal axis LA (cf. FIG. 2).

Brush module 12 has a central through-hole 12*e* of square cross-section in its inner portion 12*b* that is intended to accommodate rotating shaft 7 (cf. FIG. 2). Inner part 12*b* has, on one side of central through-hole 12*e*, a protrusion 12*f* as denoted in FIG. 4 that can mate with or engage recess 7*b* (cf. FIG. 2). On the other side, diametrically opposite, as denoted in FIG. 3, inner part 12*b* has a complementary recess 12*g*, that can mate with a mirrored protrusion 12*f'* on the backside of another identical adjacent brush module 12, as can be seen at least in part from FIG. 4. A further mirrored recess 12*g'* (cf. FIG. 4) on the backside can mate with protrusion 7*e* (cf. FIG. 2). This ensures on the one hand a torsion-proof connection between rotating shaft 7 (cf. FIG. 2) and brush module 12 as well as between adjacent brush modules 12 and, on the other hand, a predefined relative orientation of the brush modules 12, so that they collectively form a screw conveyor, as desired, with pitch P.

Brush modules 12 further have recesses 12*i* in respective free edges of brush element 12*c* that are intended for engaging an additional stirring bar, as will become apparent later (cf. FIGS. 5 and 6).

As also shown in FIGS. 3 and 4, there is only one brush element 12*c* per brush module 12, which brush element 12*c* extends circumferentially over essentially an entire circle (approx.) 360°, as seen in the direction of axis A. However preferably, as will become apparent from FIGS. 5 and 6, brush element 12*c* covers somewhat less than 360° such that there is a small open gap between said free edges.

Figure 5:
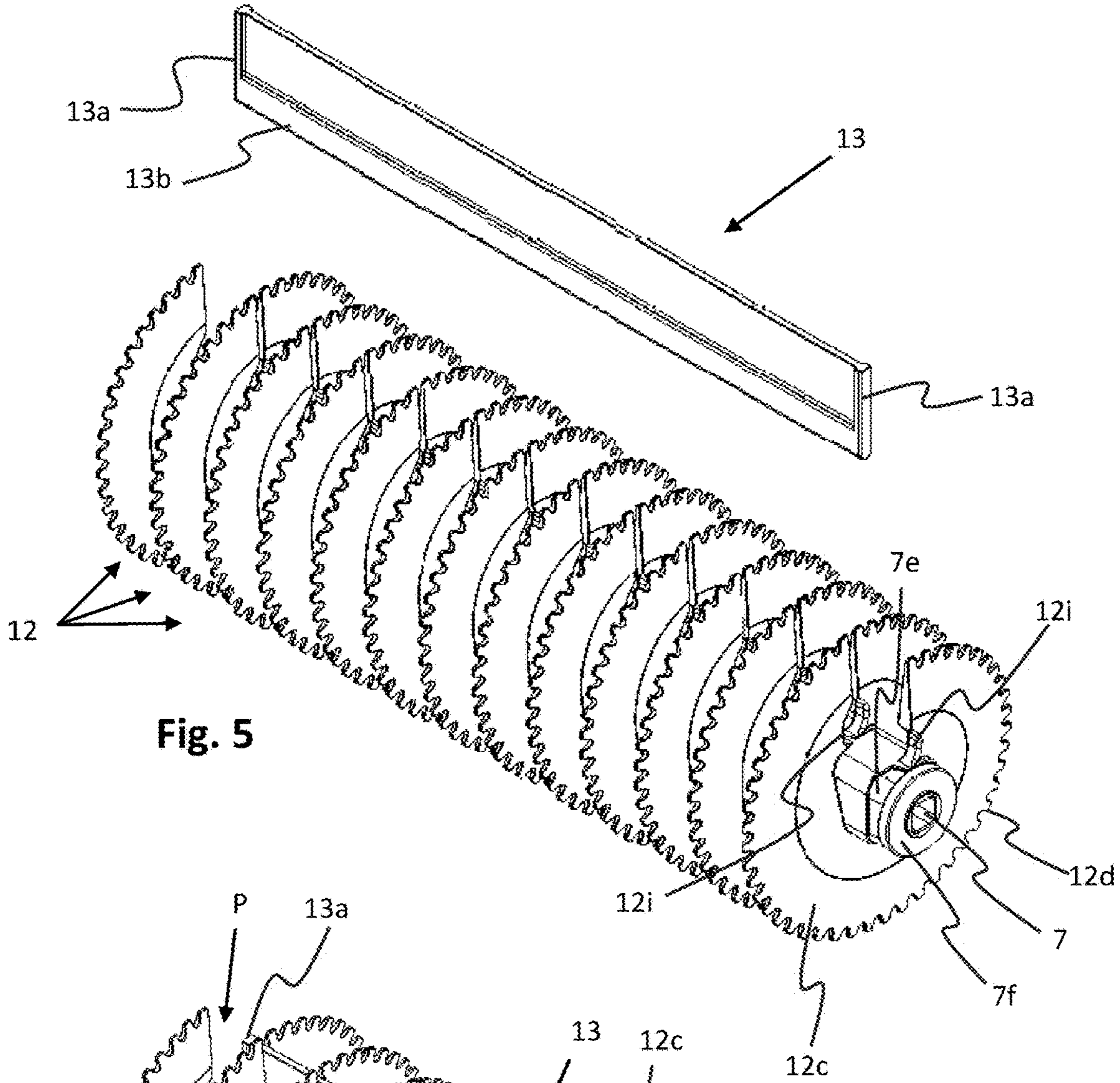
FIG. 5 shows an embodiment of the rotating brush and a stirring bar in disassembled form.
Figure 6:
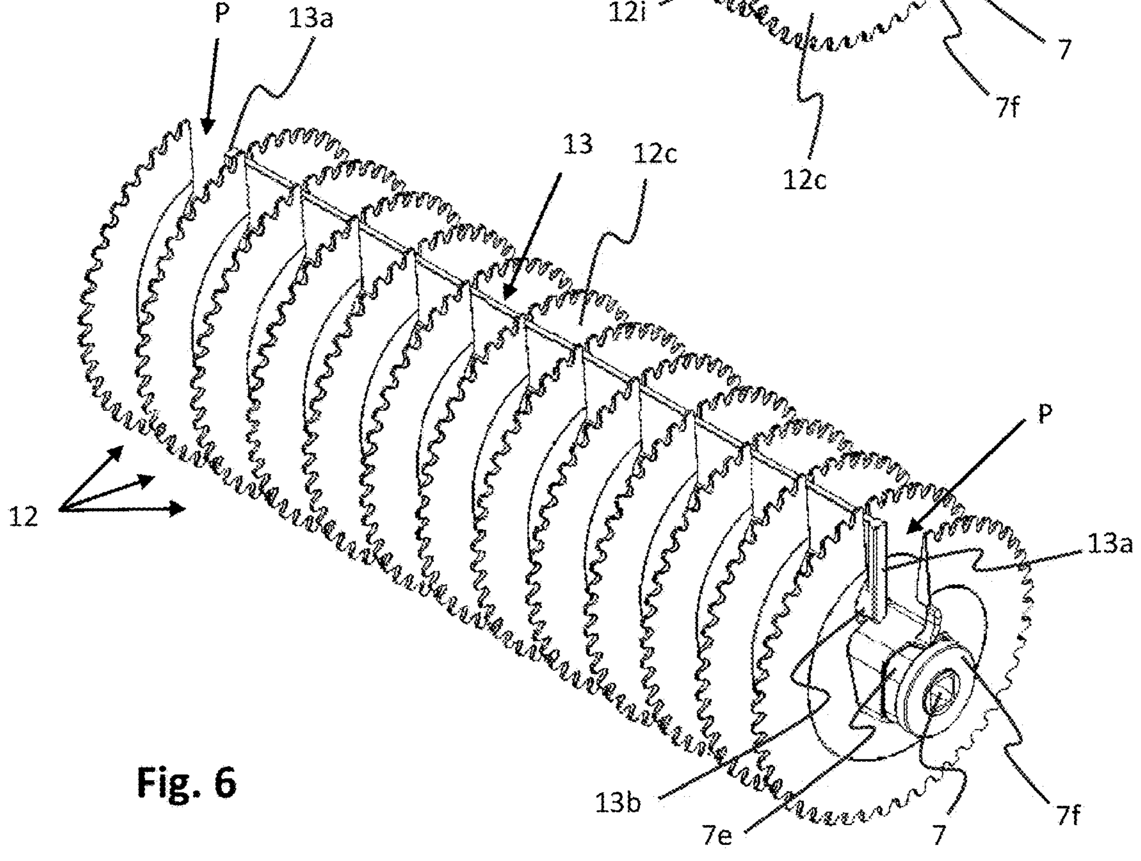
FIG. 6 shows the embodiment of FIG. 5 in assembled form.

FIGS. 5 and 6 show a plurality of brush modules 12 arranged and secured on rotating shaft 7 by means of washer 7*f*. They mutually engage by means of their central protrusions and recesses, as explained earlier. The same holds, mutatis mutandis, with respect to rotating shaft 7 and its components (cf. FIG. 2). In this way, all of the brush modules 12 are aligned with the free edges of their respective brush elements 12*c*. Further, in this way said gaps, if present, are aligned as well parallel to the longitudinal axis LA (cf. FIG. 2) of the rotating shaft 7.

According to FIG. 5, a stirring bar or baffle 13 of flat cuboid shape with thickened end and lower edges 13*a*, 13*b*, which is somewhat shorter than rotating shaft 7 so that one pitch P width remains open at both ends of the arrangement, can be inserted into said aligned gaps of the brush modules 12, cf. FIG. 6. In this way, thickened lower edge 13*b* engages said recesses 12*i* (cf. FIG. 4) for increased stability and positive (form) fit. The same holds with respect to said thickened end edges 13*a* and said free edges of the first and last brush modules 12, respectively.

As can be seen from FIG. 6, stirring bar 13 extends essentially as far in a radial direction (i.e., perpendicular to axis LA, cf. FIG. 2) as the brush elements 12*c*.

Figure 7:
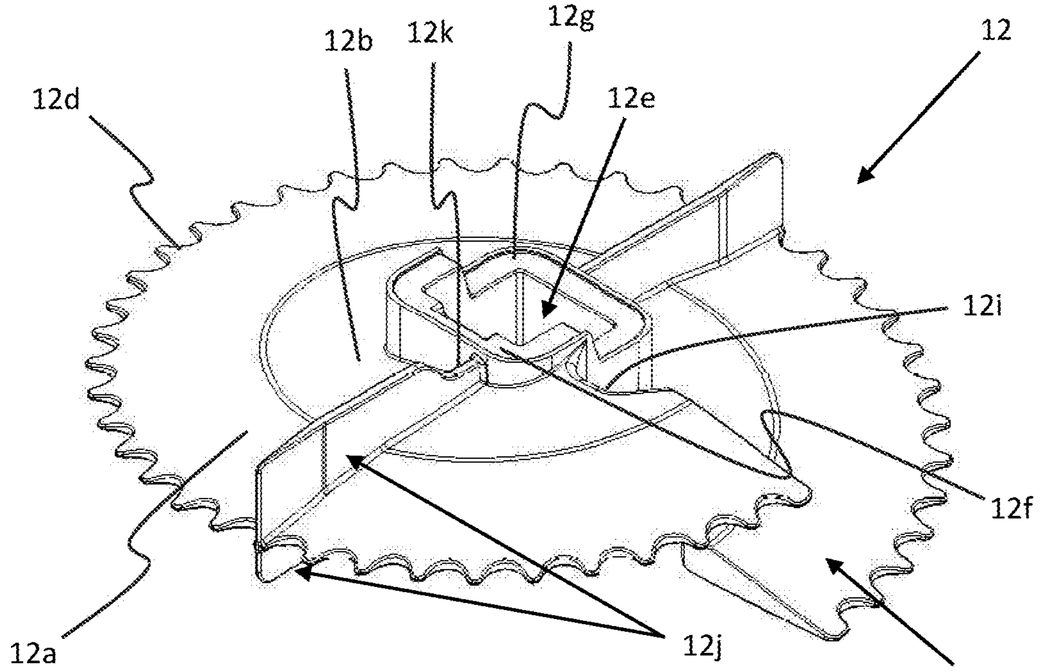
FIG. 7 shows a second embodiment of the brush modules.
Figure 8:
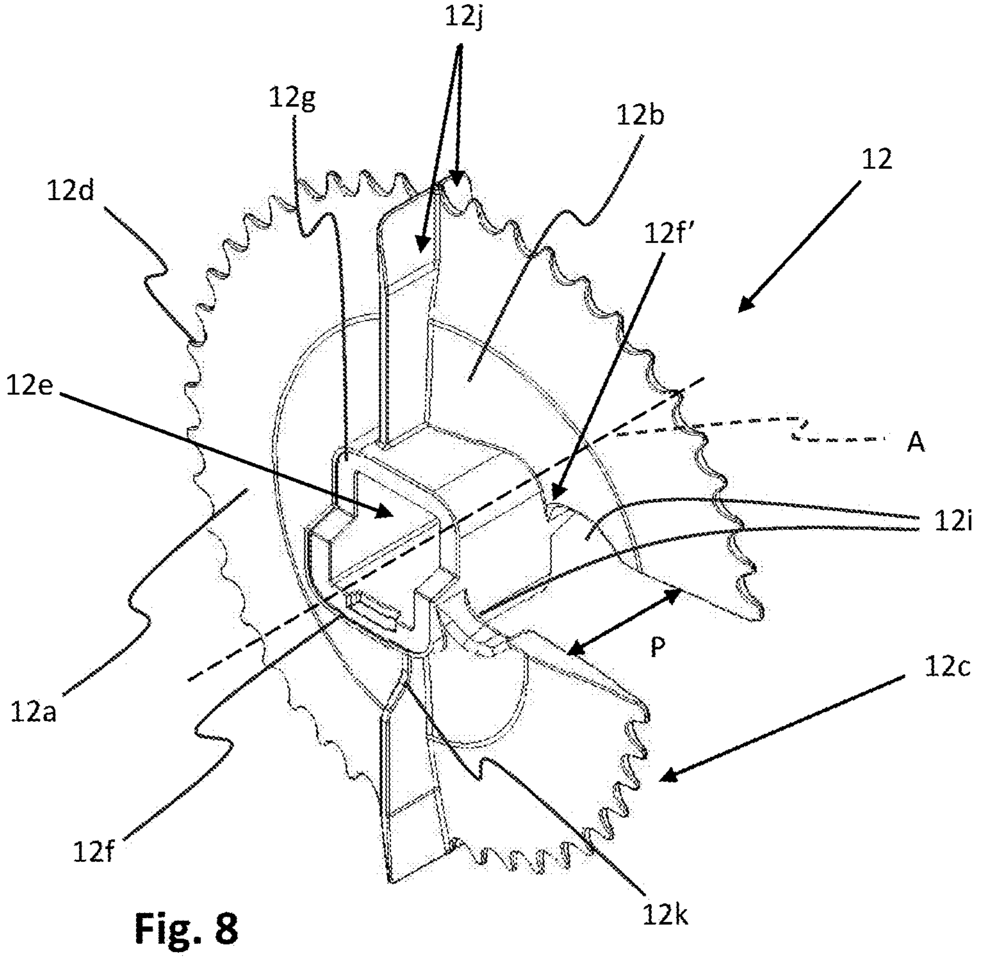
FIG. 8 shows an alternative view of the brush module in FIG. 7.

FIGS. 7 and 8 show another embodiment of the brush modules 12. Only the important differences with respect to FIGS. 3 and 4 will be explained in detail.

Brush modules 12 of FIGS. 7 and 8 have integrated (integral) stirring elements 12*j* on both sides (in the axial direction) of brush element 12*c*. These stirring elements 12*j* extend on both sides (in the radial direction) of central through-hole 12*e* and are aligned along the radial direction with a diameter of brush module 12. Overall, the combined stirring elements 12*j* are of essentially constant width (as measured in the direction of axis A, cf. FIG. 8), with exception of recess 12*k* that is intended for keeping an area near the shaft free of stirring elements and for facilitating installation of the brush or auger arrangement in the flour sifting device.

With such a design of the brush modules, no additional stirring bar 13 (cf. FIGS. 5 and 6) is required.

Figure 9:
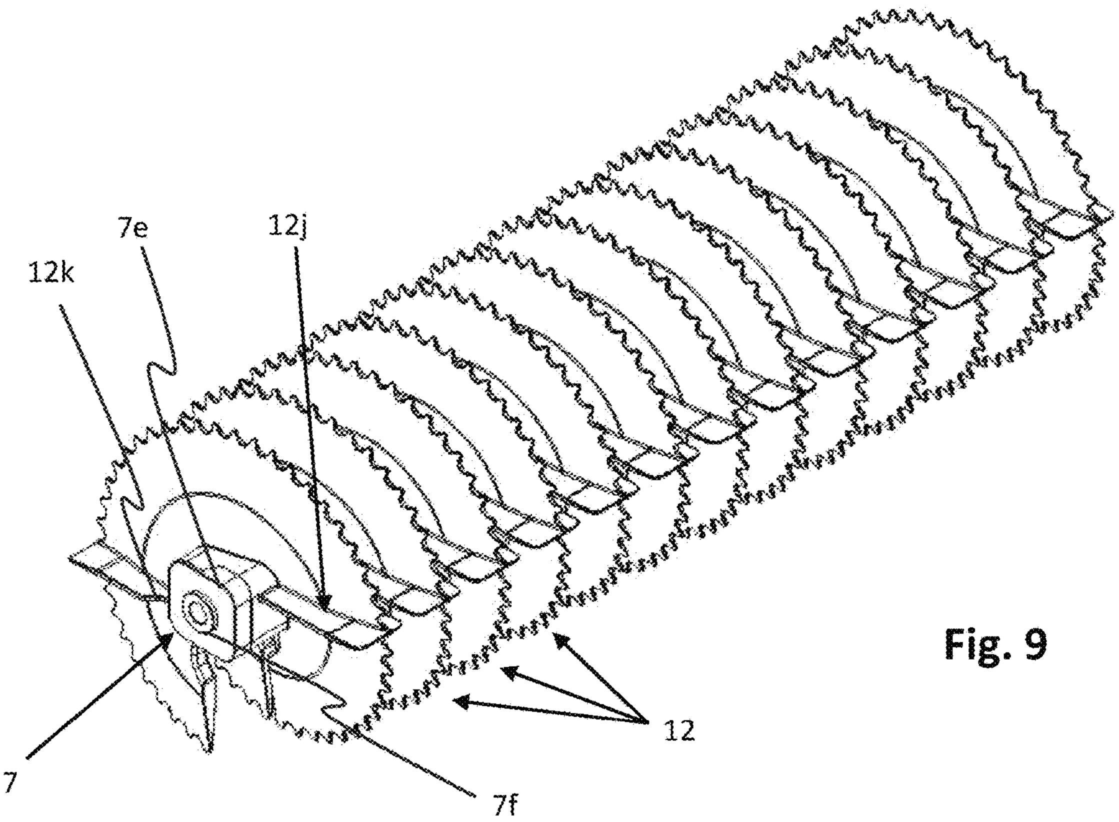
FIG. 9 shows a perspective view of several brush modules as in FIGS. 7 and 8 arranged on a rotating shaft.
Figure 10:
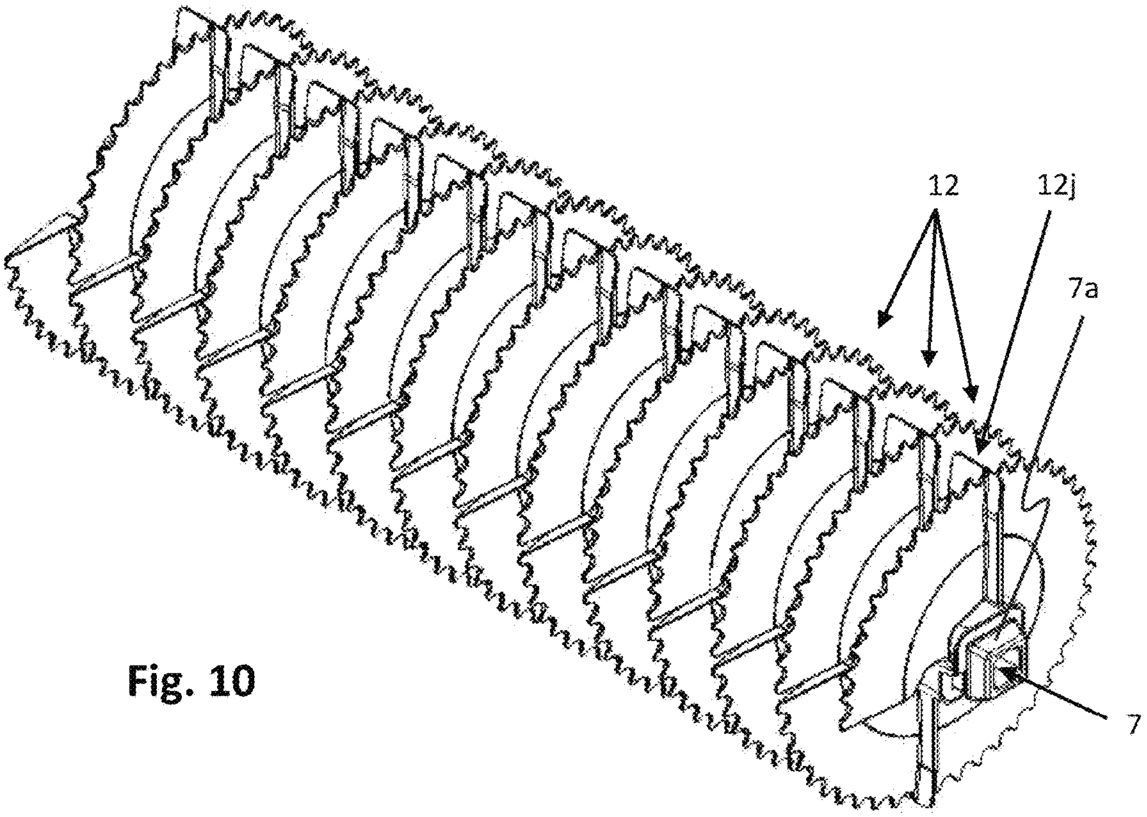
FIG. 10 shows a different perspective view of several brush modules as in FIGS. 7 and 8 arranged on a rotating shaft.

FIGS. 9 and 10 show the assembled state (rotating shaft 7 according to FIG. 2) and a plurality of brush modules 12 according to FIGS. 7 and 8, wherein all of the stirring elements 12*j* are located at the same circumferential position(s). According to FIGS. 9 and 10, this is equivalent to having two stirring bars or baffles.

Figure 11:
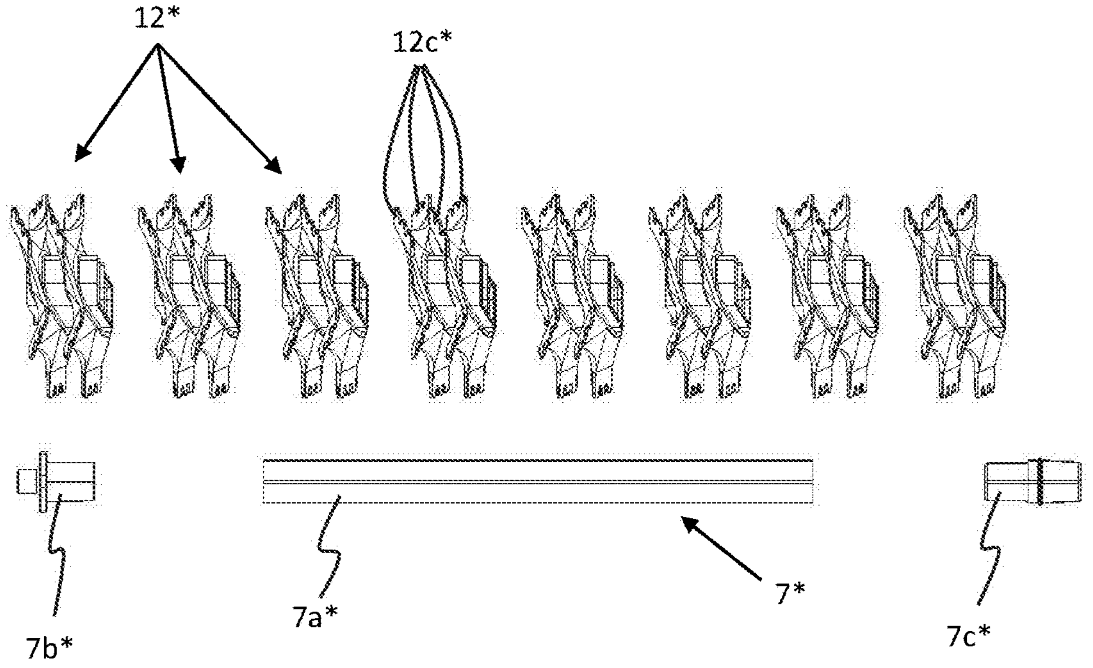
FIG. 11 shows a different embodiment of several brush modules and a rotating shaft in disassembled form.

FIGS. 11 ff relate to a different embodiment that comprises essentially different brush modules 12*, wherein each brush module 12* comprises a plurality of brush elements 12*c of particular shape(s), as will be explained with reference to FIGS. 13 and 14. As before, cf. FIGS. 2 to 10, the brush modules 12* are arranged and secured on a (slightly modified) rotating shaft 7*, as can best be seen from FIGS. 11 and 12**.

Reference numerals for brush modules 12* are the same as for brush modules 12, cf. above, where applicable, the only difference being the additional asterisk "*" The same applies to the rotating shaft 7 *. Again, only the most important deviations from the designs that were already explained in detail will be addressed.

Figure 12:
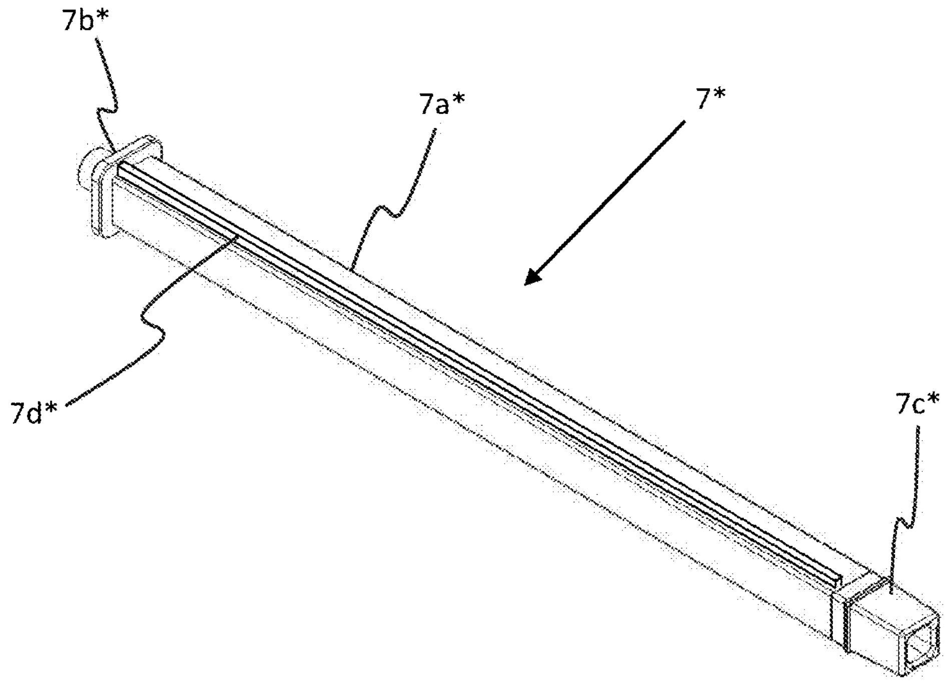
FIG. 12 shows the rotating shaft of FIG. 11 in assembled form.

According to FIGS. 11 and 12 rotating shaft 7* comprises a hollow middle portion 7*a of square cross-section in which are insertable, at respective ends thereof, a first end piece 7*b and a second end piece 7*c, respectively, that serve as abutments in order to secure or clamp the brush modules 12* on the rotating shaft 7 *. Rotating shaft 7*, in its middle portion 7*a, comprises an eccentrical longitudinal protrusion 7*d (cf. FIG. 12) that serves to align the brush modules 12***, as will become apparent later.

Figure 12A:
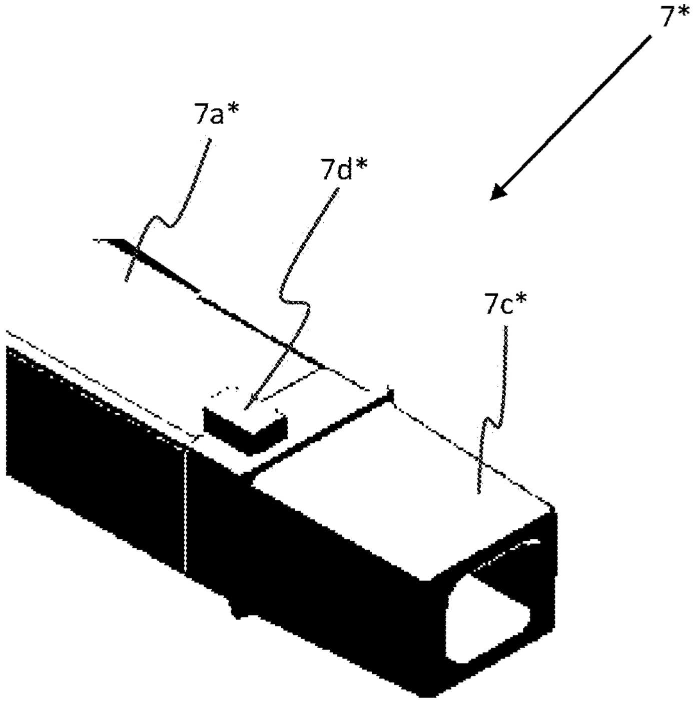
FIG. 12A shows a variant of the rotating shaft of FIG. 11.

In a preferred alternative embodiment that is shown in FIG. 12A, an eccentrical protrusion in analogy to element 7*d of FIG. 12 is provided on said second end piece 7*c only, which can be sufficient to secure the brush modules 12* on the rotating shaft 7* (cf. FIG. 11).

Figure 13:
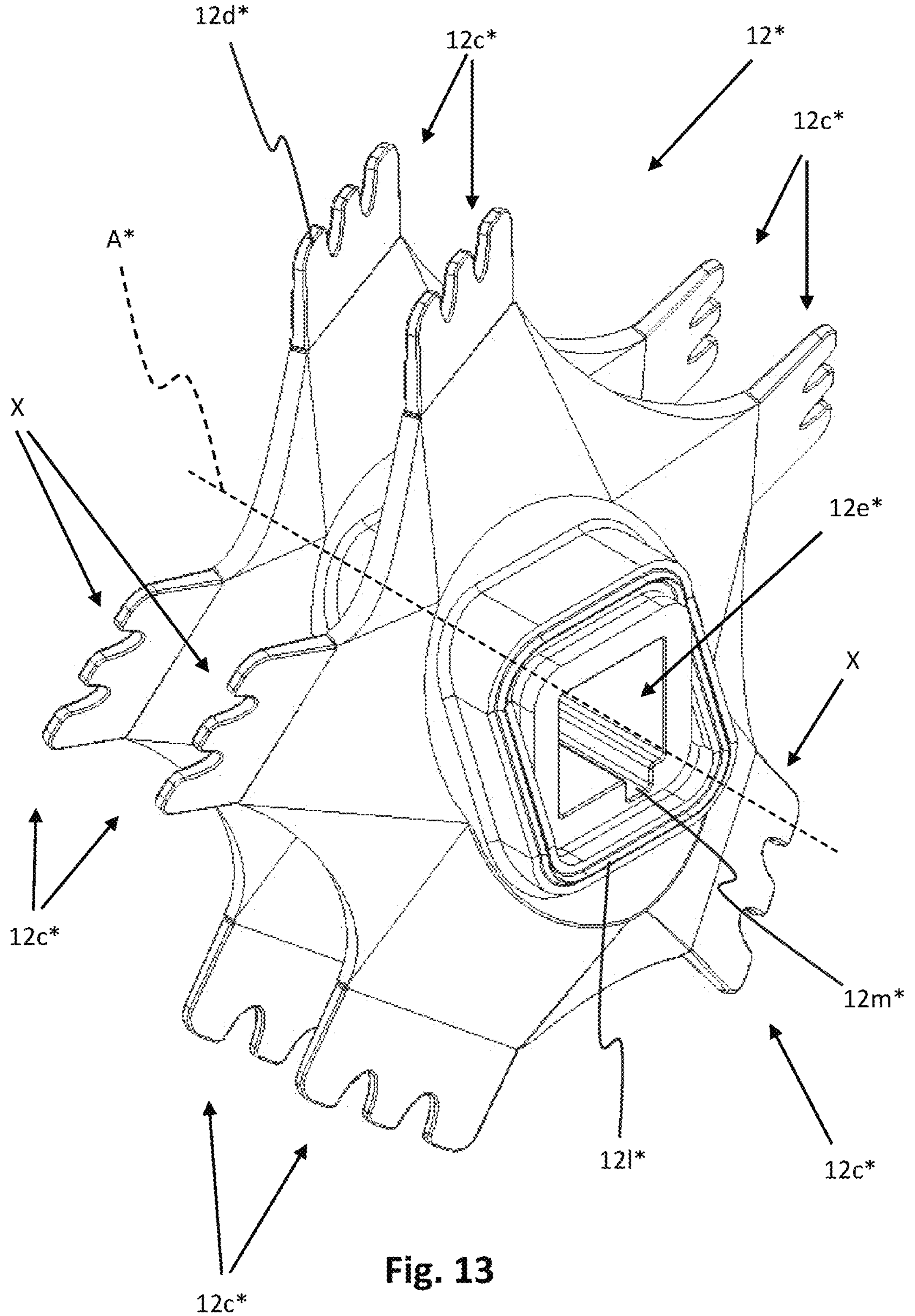
FIG. 13 shows a perspective view of one of the brush modules from FIG. 11.
Figure 14:
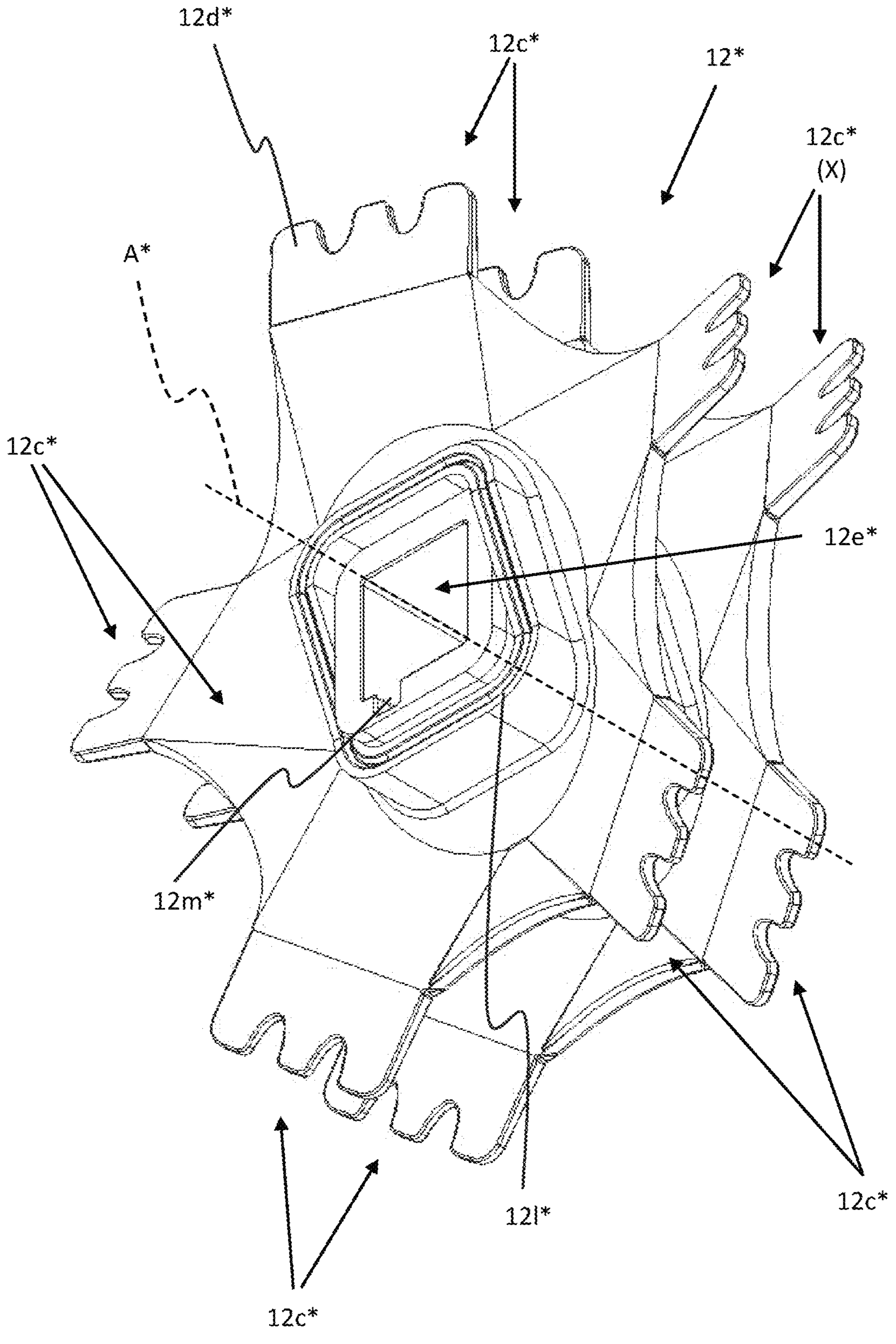
FIG. 14 shows a different perspective view of the brush module in FIG. 13.

FIGS. 13 and 14 show two different views of the brush module 12* already shown in FIG. 11. It comprises ten (10) brush elements 12*c with distal indentations 12*d that are arranged in two (2) parallel star-shaped configurations with five brush elements 12*c each, which five brush elements 12*c are equally distributed in the circumferential direction and are inclined to constitute—conjointly—a helically shaped conveyor ensemble for lateral transport of sieving material (flour). However, two of the brush elements 12*c per star-shaped configuration (denoted "X" in FIGS. 13 and 14) are oriented in an opposite direction with respect to the helical shape (also referred to as an "inverted brush element"). These inverted brush elements X serve to slow down lateral transport, just like the stirring bar and stirring elements that were described earlier. It should be noted that more than two brush elements 12*c or only one brush element 12*c could be "inverted" in this way and/or that different brush elements 12*c could be inverted differently, i.e., with different tilt angles.

Of course, the invention is neither limited to a particular number of brush elements 12*c per brush module 12* nor to a particular number of parallel configurations, which merely serve to reduce the total number of brush modules 12 ***.

Please note that the brush modules 12* adopt a modified approach with respect to the protrusions and recesses 12*f*, 12*g* described earlier (cf. FIGS. 3, 4 and 7, 8) by tilting an entire contact contour 121* of brush modules 12* with respect to axis A*. Furthermore, the brush modules 12* have an eccentrical groove 12*m that is supposed to engage the eccentrical longitudinal protrusion 7*d (cf. FIG. 12). In this way there is only one possibility of (correctly) mounting the brush modules 12* on rotating shaft 7* (cf. FIGS. 11 and 12).

Figure 15:
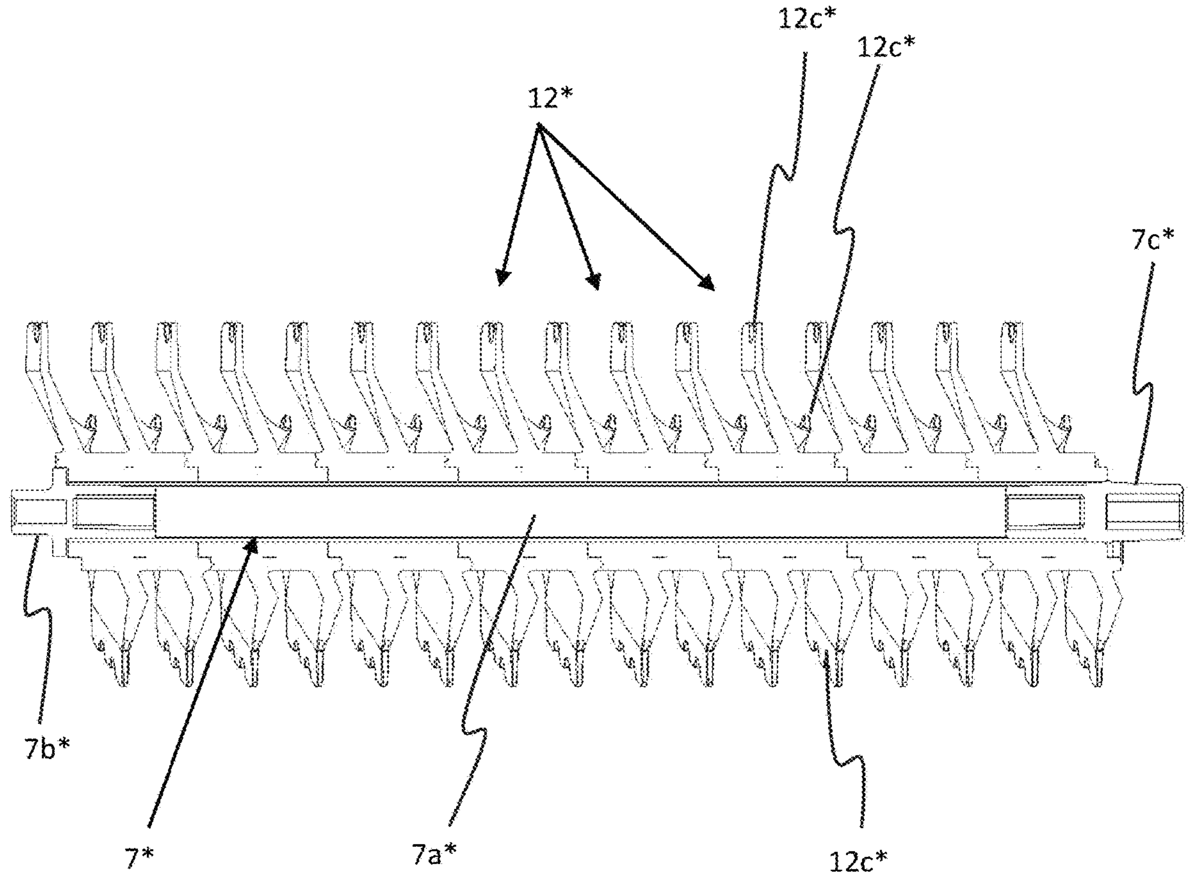
FIG. 15 shows a sectional view of the embodiment in FIG. 11 in its assembled form.

FIG. 15 shows the mounted arrangement in a sectional view. Note that adjacent brush modules 12* connect in positive or form fitting manner for torsional strength.

Figure 16:
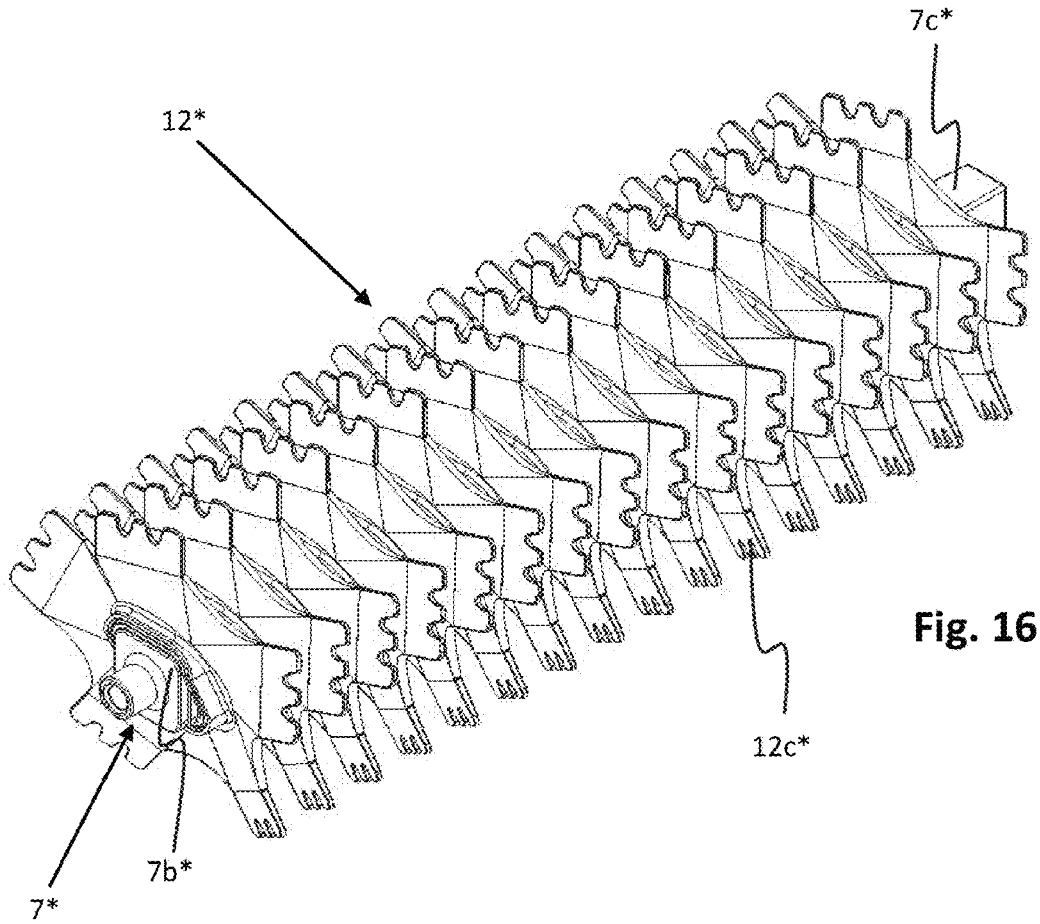
FIG. 16 shows a first perspective view of the embodiment of FIG. 15.
Figure 17:
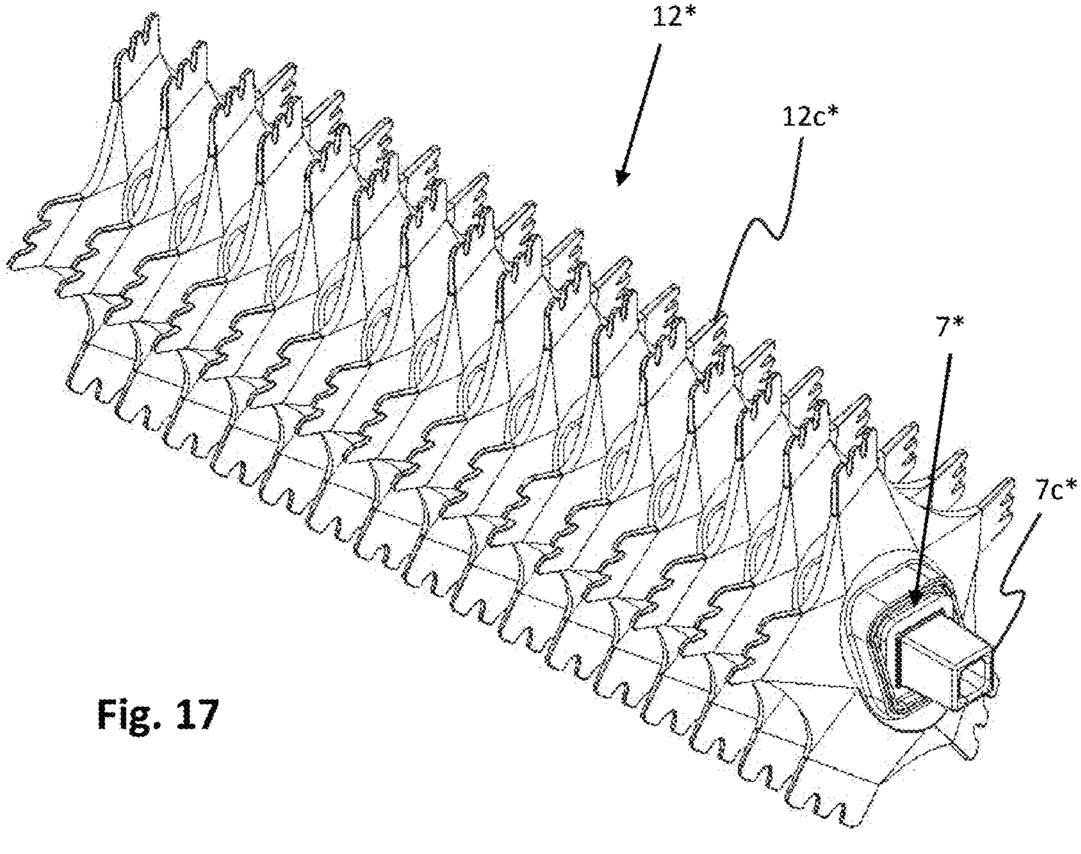
FIG. 17 shows a second perspective view of the embodiment of FIG. 15.

FIGS. 16 and 17 show two different perspective views of the arrangement in FIG. 15.

As stated before, the present disclosure also comprises embodiments wherein the rotary brush is not composed of a plurality of brush modules (reference numerals 12 and 12*) but is devised in the form of one integral element. For instance, the features relating to the stirring bar (FIGS. 5 and 6) or to the stirring elements (FIGS. 7 to 10) or to the star-like configuration with at least one inverted brush element (FIGS. 11 ff) can also be implemented independently without said modular composition of the rotary brush.

The invention claimed is:

1. A flour sifting device (1), comprising:

a flour sifting tank (4) provided with a flour sifting trough (5) with flour sifting holes at a bottom of the flour sifting trough;

a rotating brush (8) located inside the flour sifting tank (4) having a rotating shaft (7, 7*) and arranged to brush the flour sifting holes;

the rotating brush (8) comprises a first plurality of discrete flexible brush elements (12c, 12c*) that are distributed on said rotating shaft (7, 7*) and extend therefrom in a radial direction with respect to said rotating shaft (7, 7*) such that collectively the first plurality of discrete flexible brush elements (12*c*, 12*c**) form a screw conveyor with a circular outer contour;

said brush elements (12*c*, 12*c) are arranged on a second plurality of separate identical brush modules (12, 12*), each said brush module (12, 12*) comprising a number of said brush elements (12***c*, 12*c), and the brush modules (12, 12*) are individually and removably mounted or mountable on the rotating shaft (7, 7***).

2. The flour sifting device (1) of claim 1, wherein the brush modules have an equal number of said brush elements (12*c*, 12*c**).

3. The flour sifting device (1) of claim 1, wherein there is at least one of the brush elements (12*c*) per each said brush module (12), said brush element (12*c*) forming a complete helical winding.

4. The flour sifting device (1) of claim 3, wherein said brush element (12*c*) comprises at least one radial notch and the separate brush modules (12) are arranged on the rotating shaft (7) such that respective ones of the notches of the brush modules (12) are aligned in a direction parallel to the rotating shaft (7).

5. The flour sifting device (1) of claim 4, further comprising a stirring bar (13) that extends parallel to the rotating shaft (7), said stirring bar (13) being held in the notches of the brush modules (12).

6. The flour sifting device (1) of claim 3, wherein the brush modules (12) further comprise a stirring element (12*j*) that is arranged on at least one side of the brush element (12*c*) and that extends in the radial direction.

7. The flour sifting device (1) of claim 6, wherein the stirring element (12*j*) extends over a whole diameter of the brush module (12).

8. The flour sifting device (1) of claim 6, wherein the stirring element (12*j*) is formed integrally with the brush element (12*c*).

9. The flour sifting device (1) of claim 6, wherein one of the stirring elements (12*j*) is located on each side of the brush element (12*c*), and the stirring elements (12*j*) on both sides of the brush element (12*c*) are located at a common circumferential position.

10. The flour sifting device (1) of claim 9, wherein said stirring elements (12*j*) cover a pitch (P) of said brush element (12*c*) in an axial direction.

11. The flour sifting device (1) of claim 3, wherein the brush modules (12) further comprise a stirring element (12*j*) that is arranged on at least one side of the brush element (12*c*) and that extends in the radial direction, and the brush modules (12, 12*) are aligned on the rotating shaft (7, 7*) with respect to a circumferential position of the stirring elements (12*j*).

12. The flour sifting device (1) of claim 1, wherein there are a plurality of brush elements (12*c) per each said brush module (12*), and said brush elements (12*c) collectively forming at least one helical winding.

13. The flour sifting device (1) of claim 12, wherein there the plurality of brush elements (12*c**) per each said brush module are arranged equally spaced in a circumferential direction.

14. The flour sifting device (1) of claim 1, wherein the brush modules (12, 12*) are aligned on the rotating shaft (7, 7*) with respect to a circumferential position of the brush elements (12*c*, 12*c**).

15. The flour sifting device (1) of claim 14, wherein the brush modules (12, 12*) comprise a central through-hole (12*e*, 12*e) for accommodating the rotating shaft (7, 7*), said through-hole (12*e) comprising an alignment notch (12*m) and said rotating shaft comprising a longitudinal protrusion (7*d) for engaging said alignment notch (12*m**).

16. The flour sifting device (1) of claim 1, wherein said rotating shaft (7, 7*) has a square section.

17. The flour sifting device (1) of claim 1, wherein the rotating shaft (7) has one end with a stop (7*a*) for the brush modules (12) and one threaded end (7*c*) for threadedly securing said brush modules (12) on the rotating shaft (7).

* * * * *